US011578518B2

(12) United States Patent
Min et al.

(10) Patent No.: US 11,578,518 B2
(45) Date of Patent: Feb. 14, 2023

(54) HOLD-OPEN LOCK APPARATUS OF SLIDING DOOR

(71) Applicants: Hyundai Motor Company, Seoul (KR); Kia Motors Corporation, Seoul (KR); Pyeong Hwa Automotive Co., Ltd., Daegu (KR)

(72) Inventors: Chi-Young Min, Bucheon-si (KR); Seong-Geon Byeon, Daegu (KR); Ki-Ryun Ahn, Daegu (KR); Hyun-Duk Cho, Daegu (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 450 days.

(21) Appl. No.: 16/820,952

(22) Filed: Mar. 17, 2020

(65) Prior Publication Data

US 2021/0115711 A1 Apr. 22, 2021

(30) Foreign Application Priority Data

Oct. 18, 2019 (KR) .......................... 10-2019-0130112

(51) Int. Cl.
*E05C 17/60* (2006.01)
*B60J 5/06* (2006.01)
(Continued)

(52) U.S. Cl.
CPC ................. *E05C 17/60* (2013.01); *B60J 5/06* (2013.01); *E05B 79/20* (2013.01); *E05B 83/40* (2013.01)

(58) Field of Classification Search
CPC .......... E05C 17/60; E05C 17/64; E05C 17/62; B60J 5/06; B60J 5/0479; B60J 5/047;
(Continued)

(56) References Cited

U.S. PATENT DOCUMENTS 4,110,934 A * 9/1978 Zens ...................... E05D 15/101
49/223
5,605,363 A * 2/1997 Kapes ..................... E05B 83/40
292/196

(Continued)

FOREIGN PATENT DOCUMENTS

KR 100821006 B1 4/2008
KR 100836114 B1 6/2008

*Primary Examiner* — Justin B Rephann
(74) *Attorney, Agent, or Firm* — Slater Matsil, LLP

(57) ABSTRACT

A hold-open lock apparatus of a sliding door configured to limit or release rotation of a swing arm without interference with a rail is provided. The hold-open lock apparatus includes a catch unit including a catch pin that serves as a center of rotation of the swing arm, a catch fitted over the catch pin, and a pawl release lever rotatably fitted over the catch pin. The hold-open lock apparatus further includes a pawl unit including a pawl pin located on a side of the swing arm, and a pawl rotatably fitted over the pawl pin and configured to be locked to or unlocked from the catch. The hold-open lock apparatus also includes a cable unit connected to the pawl release lever and configured to rotate the pawl release lever. The pawl release lever is configured to rotate in one direction to rotate the pawl.

20 Claims, 7 Drawing Sheets

(51) Int. Cl.
*E05B 79/20* (2014.01)
*E05B 83/40* (2014.01)

(58) Field of Classification Search
CPC .......... E05B 83/40; E05B 79/20; E05B 81/16; E05B 85/26
See application file for complete search history.

(56) References Cited

U.S. PATENT DOCUMENTS

| | | | | |
|---|---|---|---|---|
| 5,979,951 | A * | 11/1999 | Shimura | E05B 83/40 |
| | | | | 292/216 |
| 6,382,705 | B1 * | 5/2002 | Lang | B60J 5/06 |
| | | | | 49/248 |
| 6,561,557 | B2 * | 5/2003 | Choi | E05B 83/40 |
| | | | | 292/216 |
| 7,644,976 | B2 * | 1/2010 | Suzuki | E05D 3/147 |
| | | | | 292/216 |
| 2007/0096504 | A1 * | 5/2007 | Kothe | E05B 79/20 |
| | | | | 296/155 |
| 2008/0231074 | A1 * | 9/2008 | Suzuki | E05D 15/56 |
| | | | | 296/146.12 |
| 2014/0000169 | A1 * | 1/2014 | Yokomori | E05F 15/603 |
| | | | | 49/349 |
| 2015/0183303 | A1 * | 7/2015 | Choi | E05D 15/0621 |
| | | | | 49/404 |
| 2015/0183304 | A1 * | 7/2015 | Choi | E05D 15/1081 |
| | | | | 49/404 |
| 2018/0100335 | A1 * | 4/2018 | Yun | E05B 77/54 |
| 2019/0390489 | A1 * | 12/2019 | Yun | E05C 17/60 |
| 2020/0217112 | A1 * | 7/2020 | Yun | E05D 13/04 |

* cited by examiner

[FIG. 1]
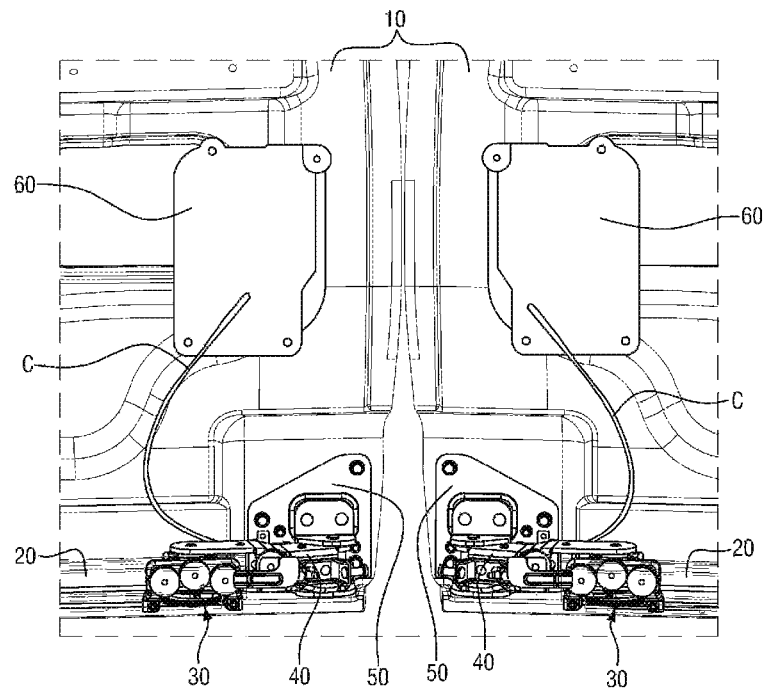
[FIG. 2]
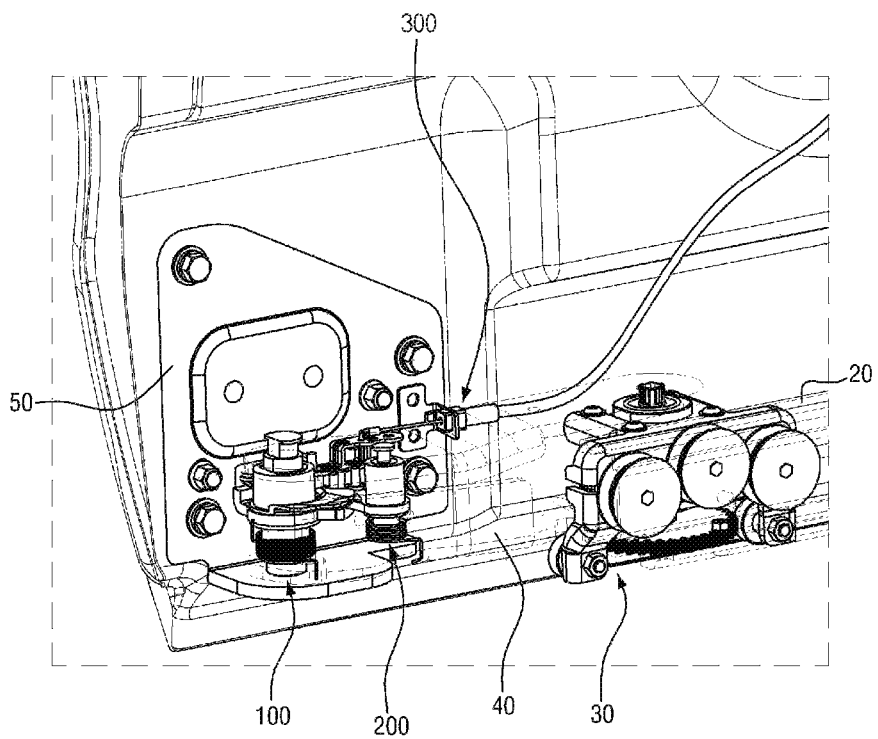

[FIG. 3]
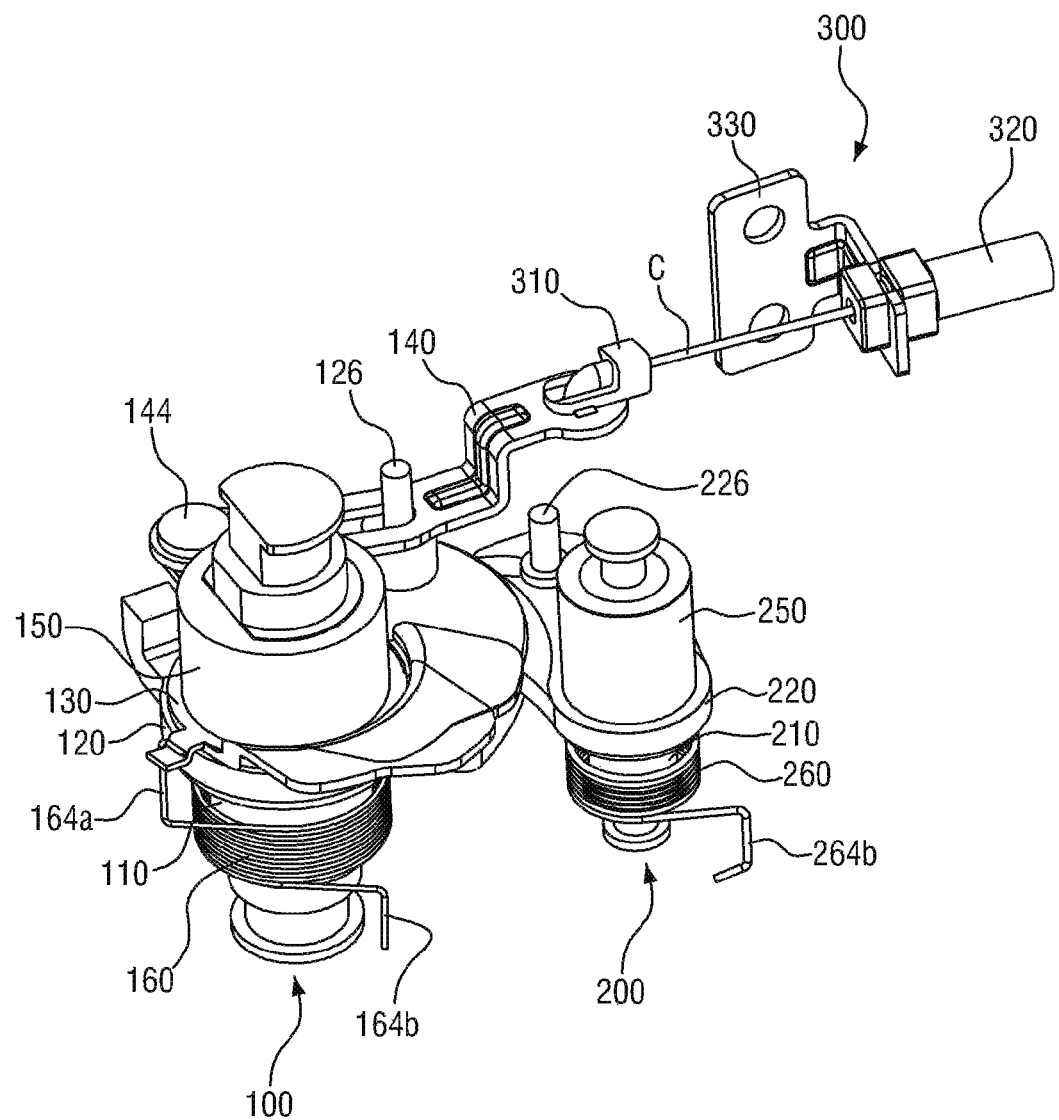

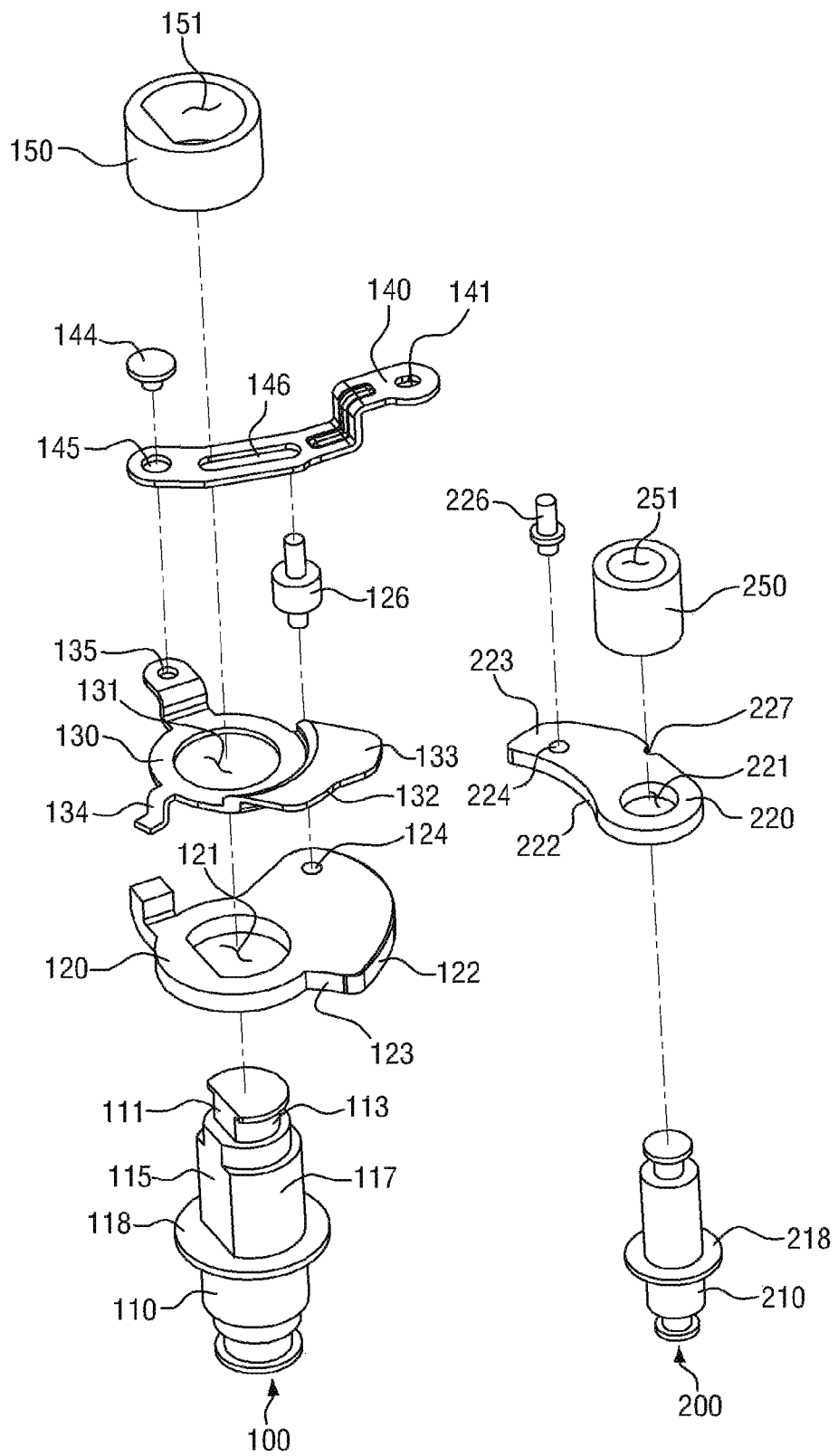
[FIG. 4]

[FIG. 5]
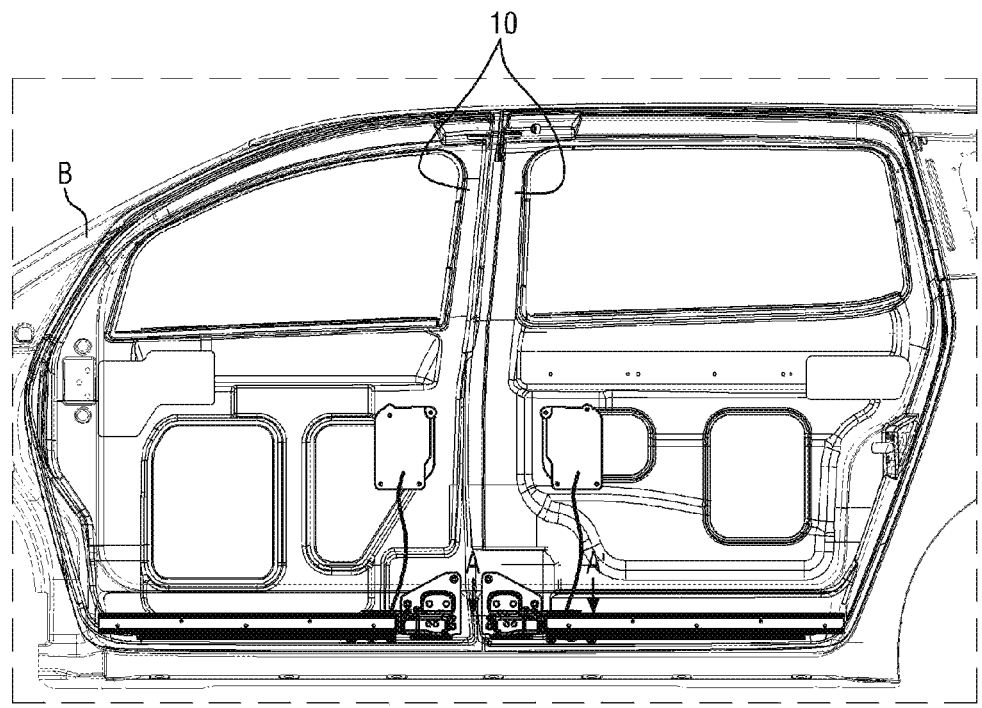
[FIG. 6]
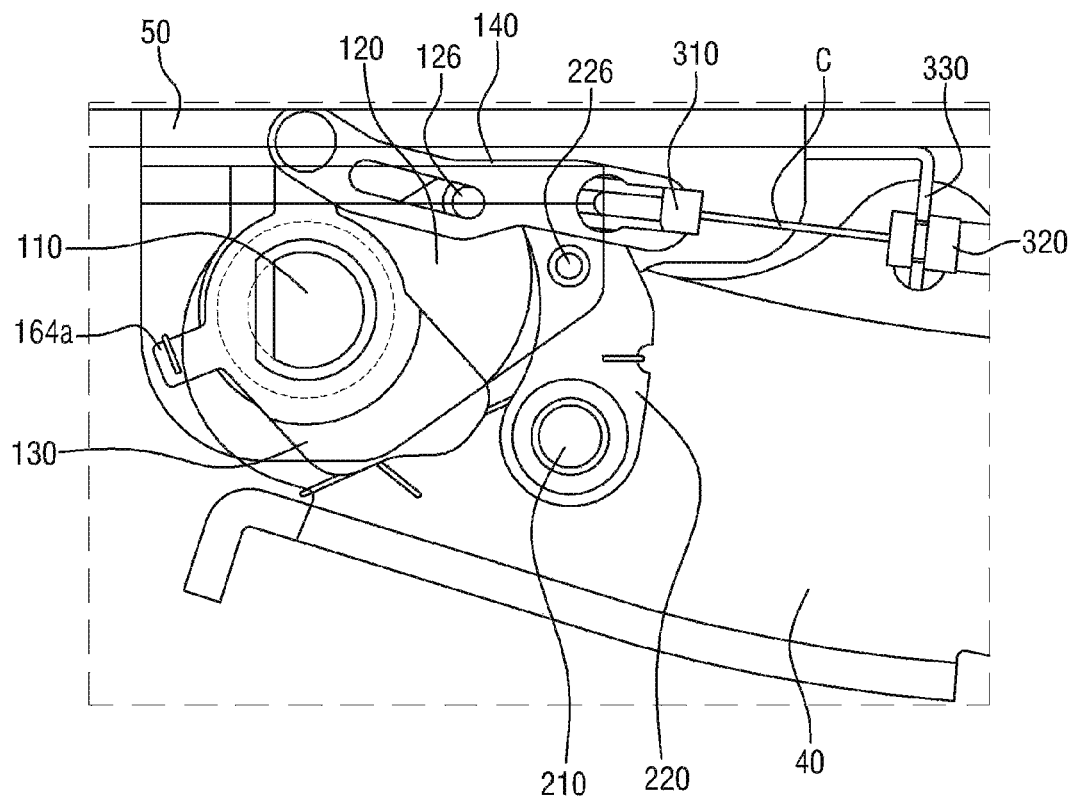

[FIG. 7]
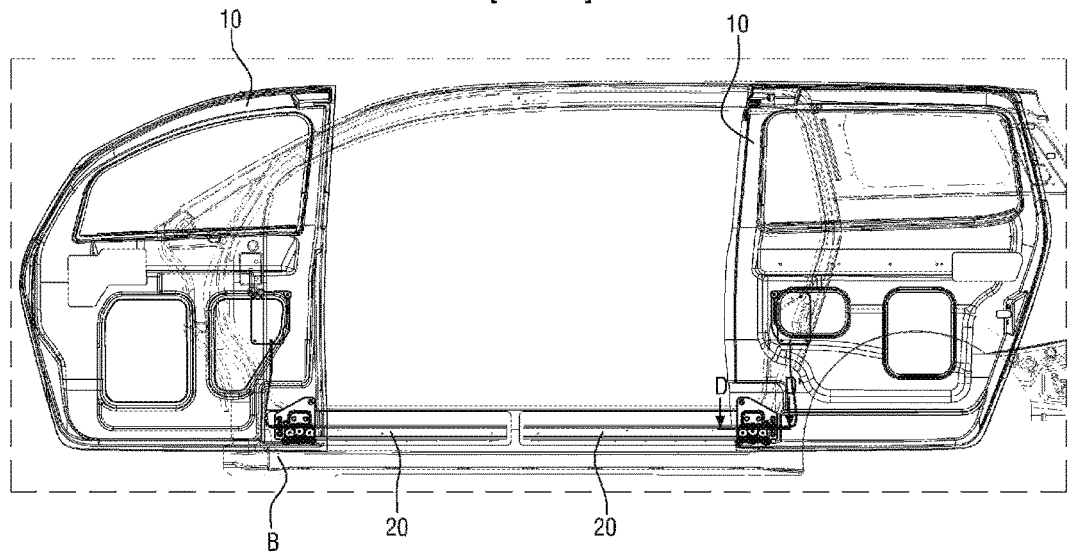
[FIG. 8]
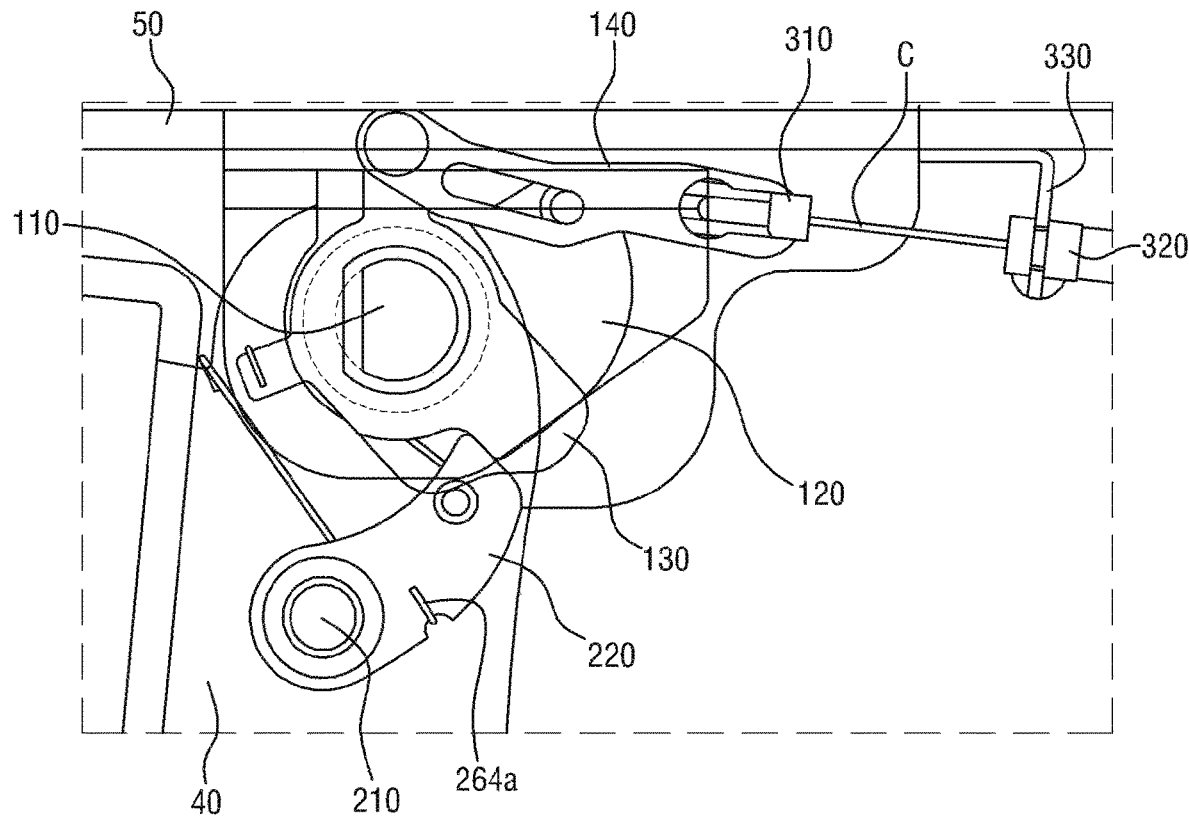

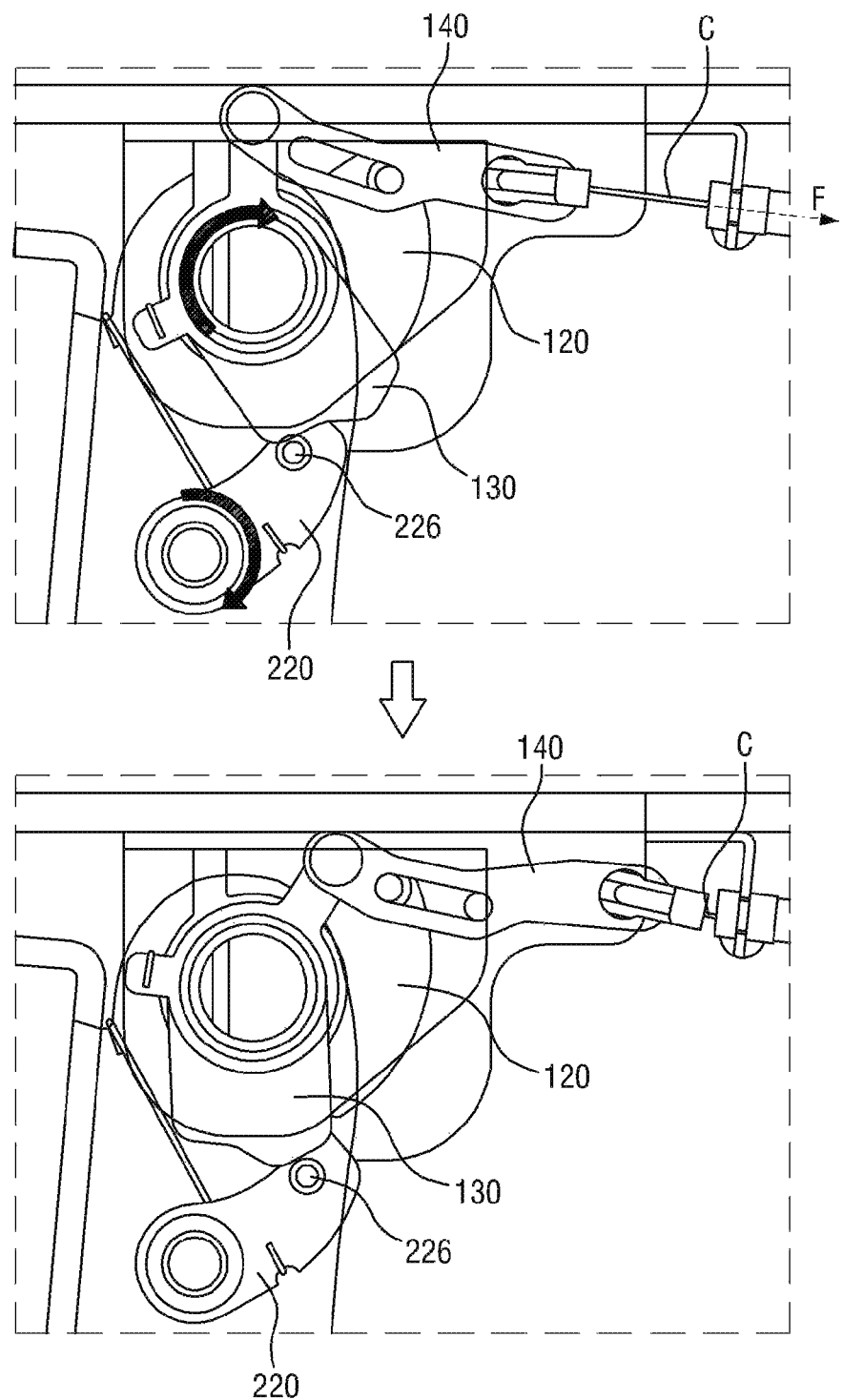
[FIG. 9]

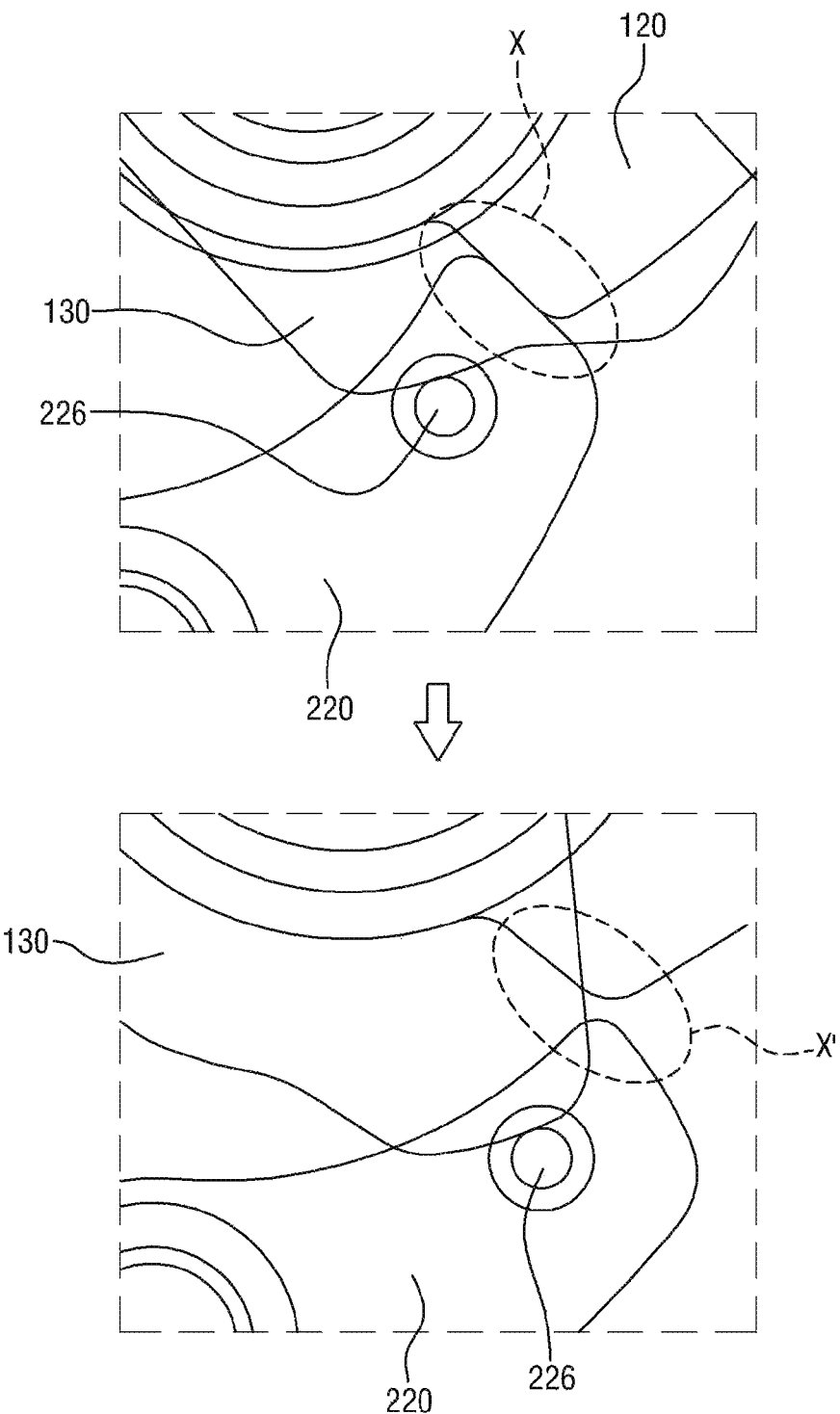
[FIG. 10]

HOLD-OPEN LOCK APPARATUS OF SLIDING DOOR

CROSS-REFERENCE TO RELATED APPLICATIONS

This application claims priority to Korean Patent Application No. 10-2019-0130112, filed on Oct. 18, 2019, which application is hereby incorporated herein by reference.

TECHNICAL FIELD

The present invention relates to a hold-open lock apparatus of a sliding door.

BACKGROUND

Generally, a vehicle has a vehicle compartment of a predetermined size to accommodate a driver or a passenger, and a vehicle body is equipped with a vehicle compartment opening door to open or close the vehicle compartment.

A sliding type of vehicle compartment opening door includes a front sliding door installed at a front position in a longitudinal direction of the vehicle, and a rear sliding door installed at a rear position in the longitudinal direction of the vehicle. The front sliding door and the rear sliding door are usually installed to move along a rail mounted on the vehicle body or the door.

Recently, a B pillarless door is used, which expands an open space of the vehicle compartment by removing a B pillar to make it easy to carry cargo or to enter or exit the vehicle in a small space.

Meanwhile, the vehicle equipped with the sliding door is provided with a hold-open lock apparatus which holds an open state of the sliding door to prevent the sliding door from being unexpectedly closed when a passenger enters or exits the vehicle or when cargo is loaded into or unloaded from the vehicle.

As related art of the hold-open lock apparatus, Korean Patent No. 10-0836114 entitled Hold-Open Lock Assembly of Sliding Door for Vehicle is configured such that a pawl rotatably connected to a lower roller bracket and a pawl lever connected to a lock cable with the same rotating axis as the pawl are operated in conjunction with each other to make a striker to enter or be released from an actuation rotor and thereby realize a locking structure.

Furthermore, as another related art, Korean Patent No. 10-0821006 entitled Hold-Open Lock Apparatus of Sliding Door for Vehicle is configured such that a latch rotatably coupled to a sliding door, a claw lever engaging with the latch, and a cable lever connected to the claw lever via a cable are operated in conjunction with each other so that the latch engages with a striker.

However, the conventional apparatuses are problematic in that the latch is not fixed to the striker if the trajectory of the sliding door is different from the trajectory of the rail, so that the sliding door cannot be stably fixed in an open position.

The above information disclosed in this Background section is only for enhancement of understanding of the background of the invention and therefore it may contain information that does not form the prior art that is already known in this country to a person of ordinary skill in the art.

SUMMARY

Embodiments of the present invention solve the above-described problems associated with the prior art and provide a novel structure which can stably support a sliding door in an open state even when a difference occurs between a door trajectory and a rail trajectory.

The present invention relates to a hold-open lock apparatus of a sliding door. Particular embodiments relate to a hold-open lock apparatus, which can limit the rotation of a swing arm without interference between a rail and a swing arm.

Embodiments of the present invention provide a hold-open lock apparatus of a sliding door configured to limit or release rotation of a swing arm without interference with a rail, the apparatus including a catch unit including a catch pin that serves as a center of rotation of the swing arm, a catch fitted over the catch pin, and a pawl release lever rotatably fitted over the catch pin, a pawl unit including a pawl pin located on a side of the swing arm and a pawl rotatably fitted over the pawl pin to be locked to or unlocked from the catch, and a cable unit connected to the pawl release lever to rotate the pawl release lever. Here, the pawl release lever rotating in one direction may rotate the pawl.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, in which:

FIG. 1 is a diagram illustrating a state in which a hold-open lock apparatus according to an embodiment of the present invention is mounted on a vehicle;

FIG. 2 is an enlarged view of the hold-open lock apparatus of FIG. 1;

FIG. 3 is a diagram illustrating a state in which a catch unit, a pawl unit, and a cable unit according to an embodiment of the present invention are coupled to each other;

FIG. 4 is a diagram illustrating a state in which the catch unit, the pawl unit, and the cable unit according to an embodiment of the present invention are separated from each other;

FIG. 5 is a diagram illustrating a state in which a sliding door is closed in a vehicle equipped with a hold-open lock apparatus according to an embodiment of the present invention;

FIG. 6 is a sectional view taken along line A-A' of FIG. 5 when viewed from above;

FIG. 7 is a diagram illustrating a state in which a sliding door is opened in a vehicle equipped with the hold-open lock apparatus according to an embodiment of the present invention;

FIG. 8 is a sectional view taken along line D-D' of FIG. 7 when viewed from above;

FIG. 9 is a diagram illustrating a change in the hold-open lock apparatus before and after a cable is tensioned in the state where a sliding door is opened; and FIG. 10 is a diagram illustrating changes in a pawl and a catch of FIG. 9.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, reference will now be made in detail to various embodiments of the present disclosure, examples of which are illustrated in the accompanying drawings and described below.

FIG. 1 is a diagram illustrating a state in which a hold-open lock apparatus according to an embodiment of the present invention is mounted on a vehicle, and FIG. 2 is an enlarged view of the hold-open lock apparatus of FIG. 1.

According to an embodiment of the present invention, a rail 20 mounted on a vehicle body B is formed in a longitudinal direction of the vehicle body B (see FIGS. 5 and 7). One end of a roller unit 30 is inserted into the rail 20 to be coupled thereto in a rolling manner. The roller unit 30 is guided by the rail 20 to move in the longitudinal direction of the vehicle.

As shown in FIG. 1, the other end of the roller unit 30 is rotatably connected to a swing arm 40, and the swing arm 40 is rotatably connected to a mounting bracket 50 that is fixedly mounted on the inside of the sliding door 10 (hereinafter, referred to as a 'door'). Thus, if the door 10 moves, the swing arm 40 is rotatable about the roller unit 30, and is movable rectilinearly along the rail 20.

The door 10 is composed of a front door and a rear door. The hold-open lock apparatus of the opposed type sliding door according to the embodiment of the present invention is applied to the front door and/or the rear door. Thus, the hold-open lock apparatuses of the sliding door applied to the front door and the rear door have the same configuration and operating principle. However, for the convenience of description, a case where the hold-open lock apparatus of the sliding door is applied to either of the doors 10 will be described herein by way of example.

Furthermore, the hold-open lock apparatus of the sliding door according to an embodiment of the present invention is applied to the rail 20 mounted on a lower portion of the vehicle body B. However, the apparatus may be applied to another rail (not shown) mounted on the vehicle.

The hold-open lock apparatus of the sliding door according to an embodiment of the present invention is connected to a remote controller 60 via a cable C. Therefore, a tensile force F may be applied to or released from the cable C under the control of the remote controller 60.

The hold-open lock apparatus of the sliding door according to an embodiment of the present invention is mounted on the swing arm 40, and is mounted on a position opposite to an end of the swing arm 40 connected to the roller unit 30. Therefore, the hold-open lock apparatus of the sliding door according to an embodiment of the present invention does not interfere with the rail 20.

Referring to FIG. 2, the hold-open lock apparatus of the sliding door according to an embodiment of the present invention includes a catch unit 100, a pawl unit 200, and a cable unit 300.

FIG. 3 is a diagram illustrating a state in which the catch unit, the pawl unit, and the cable unit according to an embodiment of the present invention are coupled to each other, and FIG. 4 is a diagram illustrating a state in which the catch unit, the pawl unit, and the cable unit according to an embodiment of the present invention are separated from each other.

Referring to FIGS. 3 and 4, the catch unit 100 includes a catch pin 110, a catch 120, and a pawl release lever 130.

The catch pin 110 has a substantially cylindrical shape, and is connected to both ends of the mounting bracket 50. The swing arm 40 is rotatably connected to the catch pin 110 between both ends of the mounting bracket 50. Here, the catch pin 110 is not rotated, and serves as a center of rotation of the swing arm 40.

To be more specific, a first flat part in and a first curved part 113 are formed on an outer circumference of an end of the catch pin 110. An inner circumference of an end of the mounting bracket 50 into which the catch pin 110 is inserted has a shape corresponding to shapes of the first flat part in and the first curved part 113. Since the first flat part 111 limits the rotation of the catch pin 110, the catch pin 110 is not rotated after being inserted into the mounting bracket 50. Moreover, since an inner circumference of an end of the swing arm 40 into which the catch pin 110 is inserted has a circular shape, the swing arm 40 may rotate about the catch pin 110.

Meanwhile, the catch pin 110 includes a second flat part 115 and a second curved part 117. Since such a configuration is related to the rotation of the catch 120 and the pawl release lever 130, this will be described later.

A step 118 is provided on a side of each of the second flat part 115 and the second curved part 117 to protrude radially from the catch pin 110.

The catch 120 is fitted over the catch pin 110 through a catch insert hole 121 and is moved. The movement of the catch is stopped by the step 118. The catch insert hole 121 has a shape corresponding to shapes of the second flat part 115 and the second curved part 117. Since the second flat part 115 limits the rotation of the catch 120, the catch 120 is not rotated after being fitted over the catch pin 110.

The catch 120 includes a moving path part 122 having a substantially curved shape, and a locking path part 123 extending from the moving path part 122.

The moving path part 122 provides a path along which a pawl 220 that will be described below is movable without interfering with the catch 120. Since the pawl 220 is rotated as the swing arm 40 rotates, the moving path part 122 according to an embodiment of the present invention has a curved shape. However, the moving path part 122 may have various shapes without being limited thereto.

The locking path part 123 is shaped such that it is bent from the moving path part 122 and extends to an inside of the catch 120, and provides a locking path along which the pawl 220 is lockable. In an embodiment of the present invention, the locking path part 123 has a substantially straight-line shape, but may have any shape as long as the pawl 220 is lockable.

A guide-pin insert hole 124 is formed at a position of the catch 120 so that one end of the guide pin 126 is inserted into the hole 124.

The pawl release lever 130 is rotatably fitted over the catch pin 110 through a pawl-release-lever insert hole 131. Since the pawl-release-lever insert hole 131 has a circular shape, the pawl release lever 130 may be rotatably fitted over the catch pin 110.

The pawl release lever 130 includes a seat part 132 protruding in a radial direction of the pawl-release-lever insert hole 131, and an unlocking part 133 extending from the seat part 132. The unlocking part 133 is shaped to protrude further in the radial direction of the pawl-release-lever insert hole 131 than the seat part 132. In an embodiment of the present invention, a connecting part between the seat part 132 and the unlocking part 133 includes an inclined surface that is inclined at a predetermined angle. Of course, the connecting part between the seat part 132 and the unlocking part 133 may have various shapes such as a curved surface.

A spring locking part 134 is formed on one side of the pawl release lever 130. The spring locking part 134 may be any shape as long as a catch spring 160 is lockable.

A first pin insert hole 135 is formed in the other side of the pawl release lever 130 to be rotatably connected to a connection lever 140 that will be described below.

A second pin insert hole 145 is formed in one side of the connection lever 140 to be rotatably connected to the pawl release lever 130, while a connection-member insert hole 141 is formed in the other side to be connected to the cable unit 300. The connection lever 140 and the pawl release lever 130 are rotatably connected to each other by inserting a pawl-release-lever pin 144 into the first pin insert hole 135 and the second pin insert hole 145. A cable connection member 310 is inserted into the connection-member insert hole 141, and the cable C is connected to the cable connection member 310.

A guide hole 146 having the shape of an elongated hole is formed in the connection lever 140. The other end of the guide pin 126 is inserted into the guide hole 146. As described above, since one end of the guide pin 126 is connected to the catch 120 and the other end is connected to the connection lever 140, the connection lever 140 is movable while being guided by the guide pin 126 inserted into the guide hole 146.

Meanwhile, the catch unit 100 according to an embodiment of the present invention includes a catch washer 150. The catch washer 150 is fitted over the catch pin 110 through a catch-washer insert hole 151. The catch-washer insert hole 151 has a shape corresponding to shapes of the second flat part 115 and the second curved part 117. Since the second flat part 115 limits the rotation of the catch washer 150, the catch washer 150 is not rotated after being fitted over the catch pin 110. The catch washer 150 functions to maintain the positions of the catch 120 and the pawl release lever 130 fitted over the catch pin 110.

Meanwhile, the catch spring 160 is formed on the catch pin 110. Ring-shaped catch-spring ring parts 164a and 164b are formed on both ends of the catch spring 160. One catch-spring ring part 164a is caught by the spring locking part 134, while the other catch-spring ring part 164b is connected to the mounting bracket 50 or the swing arm 40. Thus, if an external force is applied to the pawl release lever 130 to rotate the pawl release lever in one direction, an elastic force is applied. Meanwhile, if the external force is eliminated, the pawl release lever 130 is rotated in the other direction by an elastic restoring force.

Referring to FIGS. 3 and 4, the pawl unit 200 includes a pawl pin 210 and a pawl 220.

The pawl pin 210 is connected to the swing arm 40 to be located on one side of the catch pin 110 while having a substantially cylindrical shape. Therefore, if the swing arm 40 rotates about the catch pin 110, the pawl pin 210 rotates along the swing arm 40. A step 218 protruding in a radial direction of the pawl pin 210 is formed at a substantially central position of the pawl pin 210.

The pawl 220 is fitted over the pawl pin 210 through a pawl insert hole 221 and is moved. The movement of the pawl is stopped by the step 218. Since the pawl insert hole 221 has a circular shape, the pawl 220 is rotatably fitted over the pawl pin 210.

The pawl 220 includes a moving part 222 having a substantially curved shape, and a locking part 223 extending from the moving part 222.

The moving part 222 has a shape corresponding to that of the moving path part 122 of the catch 120. In an embodiment of the present invention, the moving path part 122 has a convex shape, while the moving part 222 has a concave shape. If the swing arm 40 rotates, the moving part 222 may move while facing the moving path part 122. Thus, while the moving part 222 moves along the moving path part 122, the catch 120 and the pawl 220 do not interfere with each other.

The locking part 223 is bent from the moving part 222, and has a shape corresponding to that of the locking path part 123 of the catch 120. In the embodiment of the present invention, the locking part 223 has a substantially straight-line shape, but may have any shape as long as the locking part 223 is lockable by the locking path part 123.

A pawl-release-pin insert hole 224 is formed at a position of the pawl 220 so that one end of the pawl release pin 226 is inserted into the hole. In an embodiment of the present invention, the pawl release pin 226 is located close to the locking part 223. The other end of the pawl release pin 226 may be seated on the seat part 132 or the unlocking part 133 of the pawl release lever 130. A spring locking notch 227 is formed on the other side of the pawl 220.

Meanwhile, the pawl unit 200 according to an embodiment of the present invention includes a pawl washer 250. The pawl washer 250 is fitted over the pawl pin 210 through a pawl-washer insert hole 251. Since the pawl-washer insert hole 251 has a substantially circular shape, the pawl washer 250 is rotatably fitted over the pawl pin 210. The pawl washer 250 functions to maintain the position of the pawl 220 fitted over the pawl pin 210.

Meanwhile, the pawl spring 260 is formed on the pawl pin 210. Ring-shaped pawl-spring ring parts 264a and 264b are formed on both ends of the pawl spring 260. One pawl-spring ring part 264a is locked by the spring locking notch 227, while the other pawl-spring ring part 264b is connected to the swing arm 40. Thus, if an external force is applied to the pawl 220 to rotate the pawl in one direction, an elastic force is applied. Meanwhile, if the external force is eliminated, the pawl 220 is rotated in the other direction by an elastic restoring force.

Referring to FIGS. 3 and 4, the cable unit 300 includes the cable connection member 310 and a cable guide part 320.

The cable connection member 310 is inserted into the connection-member insert hole 141 of the connection lever 140, and one end of the cable C is fixedly connected to the cable connection member. The other end of the cable C is guided by the cable guide part 320 to be connected to the remote controller 60. Here, the cable guide part 320 is fixed by the cable bracket 330 mounted on the inside of the door 10.

FIG. 5 is a diagram illustrating a state in which a sliding door is closed in a vehicle equipped with a hold-open lock apparatus according to an embodiment of the present invention, FIG. 6 is a sectional view taken along line A-A' of FIG. 5 when viewed from above, FIG. 7 is a diagram illustrating a state in which a sliding door is opened in a vehicle equipped with a hold-open lock apparatus according to an embodiment of the present invention, and FIG. 8 is a sectional view taken along line D-D' of FIG. 7 when viewed from above.

Hereinafter, the configuration of the hold-open lock apparatus when the door 10 is closed and opened will be described with reference to FIGS. 5 to 8. Meanwhile, FIGS. 5 to 8 show a state where no tensile force F is applied to the cable C.

Referring to FIGS. 5 and 6, when the door 10 is closed, the swing arm 40 is folded. Here, the moving part 222 of the pawl 220 and the moving path part 122 of the catch 120 face each other, and the locking part 223 and the pawl release pin 226 of the pawl 220 are spaced apart from the locking path part 123 of the catch 120. The guide pin 126 is inserted into a side of the guide hole 146.

Referring to FIGS. 7 and 8, when the door 10 is opened, the swing arm 40 is unfolded. While the door 10 rotates from the closed state to the open state, the catch unit 100 is not rotated, and the pawl unit 200 rotates along the swing arm 40. Here, the moving part 222 of the pawl 220 deviates from the moving path part 122 of the catch 120, and the locking part 223 of the pawl 220 is in contact with the locking path part 123 of the catch 120. Thus, since the catch 120 and the pawl 220 interfere with each other, the swing arm 40 cannot rotate in a direction where it is folded.

In this case, the pawl release pin 226 is seated on the seat part 132 of the pawl release lever 130, and faces the locking path part 123. The guide pin 126 is continuously inserted into a side of the guide hole 146.

FIG. 9 is a diagram illustrating a change in the hold-open lock apparatus before and after the cable is tensioned in the state where the sliding door is opened, and FIG. 10 is a diagram illustrating changes in the pawl and the catch of FIG. 9.

Hereinafter, referring to FIGS. 9 and 10, states before and after the tensile force F is applied to the cable C with the door 10 being opened will be described.

As shown in FIG. 9, if the tensile force F is applied to the cable C in the state of FIG. 8, the connection lever 140 to which the cable C is connected is guided by the guide pin 126 to move to one side (right side of FIG. 9). Then, the pawl release lever 130 connected to the connection lever 140 rotates in one direction (clockwise of FIG. 9). Thus, the pawl release pin 226 seated on the seat part 132 moves from the seat part 132 through the inclined surface to the unlocking part 133. Since the unlocking part 133 protrudes further than the seat part 132, the pawl 220 is rotated in one direction (clockwise of FIG. 9) by the unlocking part 133. As the pawl 220 rotates, the locking part 223 deviates from the locking path part 123. Consequently, the swing arm 40 may be rotated in the direction where it is folded.

Referring to FIG. 10, the locking state (see X of FIG. 10) of the catch 120 and the pawl 220 before the tensile force F is applied to the cable C and the unlocking state (see X' of FIG. 10) of the catch 120 and the pawl 220 after the tensile force F is applied to the cable C can be seen.

According to embodiments of the present invention, it is possible to limit the rotation of a swing arm without interfering with a rail, thus stably keeping a sliding door open regardless of a difference between a door trajectory and a rail trajectory.

Furthermore, according to embodiments of the present invention, a catch is not rotated in a catch pin and a locking path is provided, so that a locking or unlocking operation is stably performed between a pawl and a catch as a pawl release lever rotates.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hold-open lock apparatus of a sliding door configured to limit or release rotation of a swing arm without interference with a rail, the hold-open lock apparatus comprising:
  a catch unit including a catch pin that serves as a center of rotation of the swing arm, a catch fitted over the catch pin, and a pawl release lever rotatably fitted over the catch pin, wherein an outer circumference of the catch pin comprises a flat part and a curved part and the catch has an inner circumference of a shape corresponding to shapes of the flat part and the curved part to be fitted over the catch pin;
  a pawl unit including a pawl pin located on a side of the swing arm, and a pawl rotatably fitted over the pawl pin and configured to be locked to or unlocked from the catch; and
  a cable unit connected to the pawl release lever and configured to rotate the pawl release lever, wherein the pawl release lever is configured to rotate in one direction to rotate the pawl.

2. The hold-open lock apparatus of claim 1, wherein the pawl comprises a moving part that is configured to move while facing the catch as the swing arm rotates.

3. The hold-open lock apparatus of claim 2, wherein the pawl comprises a locking part that is bent and extends from the moving part and is configured to be locked by the catch to limit rotation of the swing arm from one direction to another direction.

4. The hold-open lock apparatus of claim 3, wherein the catch comprises a moving path part to define a moving path of the moving part while facing the moving part.

5. The hold-open lock apparatus of claim 4, wherein the catch comprises a locking path part that is bent from the moving path part to extend to an inside of the catch and provides a locking path to which the locking part is lockable.

6. The hold-open lock apparatus of claim 1, wherein a pawl release pin is provided on a side of the pawl so that the pawl release lever is configured to rotate the pawl.

7. The hold-open lock apparatus of claim 6, wherein the pawl release lever comprises:
  a seat part on which the pawl release pin is configured to be seated as the swing arm rotates; and
  an unlocking part protruding from the seat part, the pawl release pin configured to move along the unlocking part as the pawl release lever rotates.

8. The hold-open lock apparatus of claim 7, further comprising:
  an inclined surface between the seat part and the unlocking part.

9. The hold-open lock apparatus of claim 1, further comprising:

a connection lever having a first side rotatably connected to the pawl release lever and a second side connected to the cable unit.

10. The hold-open lock apparatus of claim 9, wherein:
a guide hole is provided in the connection lever; and
a guide pin is provided on the catch and is configured to be inserted into the guide hole.

11. The hold-open lock apparatus of claim 1, wherein:
a spring is provided on the catch pin and is configured to apply an elastic force to the pawl release lever; and
a spring is provided on the pawl pin and is configured to apply an elastic force to the pawl.

12. A vehicle comprising:
a vehicle body;
a rail mounted on the vehicle body;
a roller unit, wherein a first end of the roller unit is inserted into the rail and a second end of the roller unit is rotatably connected to a swing arm; and
a sliding door, wherein the sliding door comprises a mounting bracket and the swing arm is rotatably connected to the mounting bracket, and wherein the sliding door further comprises a hold-open lock apparatus configured to limit or release rotation of the swing arm without interference with the rail, the hold-open lock apparatus comprising:
a catch unit including a catch pin that serves as a center of rotation of the swing arm, a catch fitted over the catch pin, and a pawl release lever rotatably fitted over the catch pin, wherein an outer circumference of the catch pin comprises a flat part and a curved part and the catch has an inner circumference of a shape corresponding to shapes of the flat part and the curved part to be fitted over the catch pin;
a pawl unit including a pawl pin located on a side of the swing arm, and a pawl rotatably fitted over the pawl pin and configured to be locked to or unlocked from the catch; and
a cable unit connected to the pawl release lever and configured to rotate the pawl release lever, wherein the pawl release lever is configured to rotate in one direction to rotate the pawl.

13. The vehicle of claim 12, wherein the pawl comprises:
a moving part that is configured to move while facing the catch as the swing arm rotates; and
a locking part that is bent and extends from the moving part and is configured to be locked by the catch to limit rotation of the swing arm from one direction to an other direction.

14. The vehicle of claim 13, wherein the catch comprises:
a moving path part to define a moving path of the moving part while facing the moving part; and
a locking path part that is bent from the moving path part to extend to an inside of the catch and provides a locking path to which the locking part is lockable.

15. The vehicle of claim 12, wherein a pawl release pin is provided on a side of the pawl so that the pawl release lever is configured to rotate the pawl.

16. The vehicle of claim 15, wherein the pawl release lever comprises:
a seat part on which the pawl release pin is configured to be seated as the swing arm rotates; and
an unlocking part protruding from the seat part, the pawl release pin configured to move along the unlocking part as the pawl release lever rotates,
wherein the vehicle further comprises an inclined surface between the seat part and the unlocking part.

17. The vehicle of claim 12, further comprising:
a connection lever having a first side rotatably connected to the pawl release lever and a second side connected to the cable unit.

18. The vehicle of claim 17, wherein:
a guide hole is provided in the connection lever; and
a guide pin is provided on the catch and is configured to be inserted into the guide hole.

19. The hold-open lock apparatus of claim 12, wherein:
a spring is provided on the catch pin and is configured to apply an elastic force to the pawl release lever; and
a spring is provided on the pawl pin and is configured to apply an elastic force to the pawl.

20. A hold-open lock apparatus of a sliding door configured to limit or release rotation of a swing arm without interference with a rail, the hold-open lock apparatus comprising:
a catch unit including a catch pin that serves as a center of rotation of the swing arm, a catch fitted over the catch pin, and a pawl release lever rotatably fitted over the catch pin, wherein an outer circumference of the catch pin comprises a flat part and a curved part and the catch has an inner circumference of a shape corresponding to shapes of the flat part and the curved part to be fitted over the catch pin;
a pawl unit including a pawl pin located on a side of the swing arm, and a pawl rotatably fitted over the pawl pin and configured to be locked to or unlocked from the catch, wherein the pawl comprises a moving part that is configured to move while facing the catch as the swing arm rotates;
a pawl release pin located on a side of the pawl so that the pawl release lever is configured to rotate the pawl; and
a cable unit connected to the pawl release lever and configured to rotate the pawl release lever, wherein the pawl release lever is configured to rotate in one direction to rotate the pawl.

* * * * *